United States Patent
Venkataraman et al.

(10) Patent No.: US 11,343,332 B2
(45) Date of Patent: May 24, 2022

(54) METHOD FOR SEAMLESS MIGRATION OF SESSION AUTHENTICATION TO A DIFFERENT STATEFUL DIAMETER AUTHENTICATING PEER

(71) Applicant: Telefonaktiebolaget LM Ericsson (publ), Stockholm (SE)

(72) Inventors: Natarajan Venkataraman, Bangalore (IN); Parag Narayanrao Pote, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/770,145

(22) PCT Filed: Feb. 8, 2018

(86) PCT No.: PCT/IN2018/050066
§ 371 (c)(1),
(2) Date: Jun. 5, 2020

(87) PCT Pub. No.: WO2019/155477
PCT Pub. Date: Aug. 15, 2019

(65) Prior Publication Data
US 2020/0358860 A1 Nov. 12, 2020

(51) Int. Cl.
*H04L 29/08* (2006.01)
*H04L 29/06* (2006.01)
(Continued)

(52) U.S. Cl.
CPC ........ *H04L 67/148* (2013.01); *G06F 9/45558* (2013.01); *H04L 63/0892* (2013.01); *G06F 2009/45595* (2013.01)

(58) Field of Classification Search
CPC ... H04L 67/148; H04L 63/0892; H04L 29/08; G06F 9/45558; G06F 2009/45595; G06F 15/16
(Continued)

(56) References Cited

U.S. PATENT DOCUMENTS 8,499,336 B2 7/2013 Alex et al.
8,726,068 B2 * 5/2014 Korhonen ............... H04L 69/40
714/4.11
(Continued)

FOREIGN PATENT DOCUMENTS

CN 101411115 B * 6/2012 .......... H04W 12/062
CN 106331074 A 1/2017
(Continued)

OTHER PUBLICATIONS

PCT International Search Report and Written Opinion dated May 10, 2018 for International Application PCT/IN2018/050066, 7 pages.
(Continued)

*Primary Examiner* — David R Lazaro
*Assistant Examiner* — Berhanu Shitayewoldetadik
(74) *Attorney, Agent, or Firm* — Sage Patent Group

(57) ABSTRACT

A method and system that migrates a subscriber session from a first authentication, authorization, and accounting (AAA) authentication server to a second AAA authentication server, where the first AAA authentication server is stateful. The method includes receiving an authenticate session request from a client application, sending (505) the authenticate session request to the first AAA authentication server, detecting (511) connectivity failure with the first AAA authentication server, and sending (513) a reauthentication required message to the client application.

17 Claims, 8 Drawing Sheets

(51) Int. Cl.
  *G06F 9/455* (2018.01)
  *G06F 15/16* (2006.01)
  *H04L 67/148* (2022.01)
  *H04L 9/40* (2022.01)

(58) Field of Classification Search
  USPC .......................................................... 709/227
  See application file for complete search history.

(56) References Cited

U.S. PATENT DOCUMENTS

| | | | | |
|---|---|---|---|---|
| 9,253,019 | B1* | 2/2016 | Romanov | H04L 29/12509 |
| 9,749,294 | B1* | 8/2017 | Marquardt | H04L 63/0209 |
| 10,020,986 | B1* | 7/2018 | Romanov | H04L 29/12509 |
| 2003/0140151 | A1* | 7/2003 | Daenen | H04L 63/0272 |
| | | | | 709/229 |
| 2004/0032844 | A1* | 2/2004 | Lewis | H04W 48/08 |
| | | | | 370/338 |
| 2008/0141166 | A1* | 6/2008 | Goldberg | G06F 3/0482 |
| | | | | 715/788 |
| 2008/0270534 | A1* | 10/2008 | Xia | H04W 12/069 |
| | | | | 709/203 |
| 2011/0099624 | A1* | 4/2011 | Schwartzman | H04L 63/0272 |
| | | | | 726/15 |
| 2012/0042071 | A1* | 2/2012 | Ponnuswamy | H04L 63/20 |
| | | | | 709/225 |
| 2012/0131639 | A1* | 5/2012 | Alex | H04L 67/148 |
| | | | | 726/3 |
| 2013/0185767 | A1* | 7/2013 | Tirupachur Comerica | |
| | | | | H04L 9/321 |
| | | | | 726/4 |
| 2016/0127169 | A1* | 5/2016 | Rosa de Sousa Teixeira | |
| | | | | H04L 43/08 |
| | | | | 370/216 |
| 2016/0183089 | A1* | 6/2016 | Pudney | H04L 63/10 |
| | | | | 726/3 |
| 2016/0381019 | A1* | 12/2016 | Modi | H04L 69/40 |
| | | | | 726/4 |
| 2017/0237781 | A1* | 8/2017 | Butala | H04L 12/1403 |
| | | | | 709/227 |
| 2018/0013680 | A1* | 1/2018 | Bull | H04W 16/14 |
| 2018/0109632 | A1* | 4/2018 | Stammers | H04L 67/1004 |
| 2018/0199384 | A1* | 7/2018 | Mizikovsky | H04W 76/38 |
| 2018/0324281 | A1* | 11/2018 | Gupta | H04L 43/0864 |
| 2019/0116529 | A1* | 4/2019 | Lu | H04W 48/18 |
| 2019/0286469 | A1* | 9/2019 | Lakshmikantha | G06F 9/45558 |
| 2020/0014561 | A1* | 1/2020 | Koat | H04L 12/66 |
| 2020/0358860 | A1* | 11/2020 | Venkataraman | H04L 63/0892 |

FOREIGN PATENT DOCUMENTS

| | | | | |
|---|---|---|---|---|
| EP | 2837162 B1 * | 1/2019 | ........ | H04L 63/0892 |
| WO | WO-0167789 A2 * | 9/2001 | ............ | H04W 76/12 |
| WO | WO-2007093216 A1 * | 8/2007 | ............ | H04L 63/08 |
| WO | WO-2010013251 A1 * | 2/2010 | ............ | G06Q 40/12 |
| WO | WO-2014044491 A1 * | 3/2014 | ........ | H04L 63/0892 |
| WO | WO-2016044718 A1 * | 3/2016 | ............ | H04L 67/34 |

OTHER PUBLICATIONS

Fajardo et al., "Diameter Based Protocol", Internet Engineering Task Force, Request for Comments: 6733, Oct. 2012, 152 pages.

G. Zorn et al., "Diameter Network Access Server Application", Internet Engineering Task Force, Request for Comments: 7155, Apr. 2014, 70 pages.

\* cited by examiner

METHOD FOR SEAMLESS MIGRATION OF SESSION AUTHENTICATION TO A DIFFERENT STATEFUL DIAMETER AUTHENTICATING PEER

CROSS-REFERENCE TO RELATED APPLICATIONS

This application is a 35 U.S.C. § 371 national stage application for International Application No. PCT/IN2018/050066, entitled "A METHOD FOR SEAMLESS MIGRATION OF SESSION AUTHENTICATION TO A DIFFERENT STATEFUL DIAMETER AUTHENTICATING PEER", filed on Feb. 8, 2018, the disclosures and contents of which are hereby incorporated by reference in their entireties.

TECHNICAL FIELD

Embodiments of the invention relate to the field of session migration; and more specifically, to the handling of a stateful session migration between authentication peers.

BACKGROUND

Internet service providers (ISP), cellular network providers and similar networking infrastructures are designed to enable a large number of end user devices to have connectivity with services via these networks as well as access to services via the broader Internet. These networks are generally administered by the network provider and the characteristics of the access (e.g., bandwidth allotment and data allowances) are based on service contracts between end users and the network providers.

These networks utilize metrics and traffic engineering protocols to monitor the usage of the network resources by end users and to manage this usage. Often the end user devices connect through local radio access networks (e.g., with cellular networks) or via customer premise equipment (e.g., broadband modems) that are the initial connecting points to these provider networks. These components provide access points to the networks and may be connected with various edge devices such as border gateways that manage access to the broader provider network. These border gateways (e.g., broadband network gateway (BNG)) or edge routers may service the end user devices and work in connection with authentication, authorization, and accounting (AAA) services in the provider network to keep metrics and accounting relative to each end user.

For example, the AAA services in the provider network can authenticate or authorize initial end user access to the provider networks. The AAA services can also configure the characteristics of the end user access at the BNG or similar network devices in the provider network. The AAA services can use various protocols for the network devices in the provider network to interact with them. One AAA protocol that is commonly utilizes is the remote authentication dial-in user service (RADIUS). A closely related AAA protocol called Diameter was initially designed to replace RADIUS, but RADIUS has continued to be utilized in many types of networks with Diameter being utilized in others.

SUMMARY

In one embodiment, a method and system migrates a subscriber session from a first authentication, authorization, and accounting (AAA) authentication server to a second AAA authentication server, where the first AAA authentication server is stateful. The method includes receiving an authenticate session request from a client application, sending (505) the authenticate session request to the first AAA authentication server, detecting (511) connectivity failure with the first AAA authentication server, and sending (513) a reauthentication required message to the client application.

In a further embodiment, a network device is configured to execute a plurality of virtual machines. The virtual machines are configured to support network function virtualization (NFV). The plurality of virtual machines support the method for migrating a subscriber session from the first AAA authentication server to the second AAA authentication server, where the first AAA authentication server is stateful. The network device includes a non-transitory computer readable medium having stored therein a AAA client, and a processor coupled to the non-transitory computer readable medium configured to execute a virtual machine from the plurality of virtual machine. The virtual machine executes the AAA client. The AAA client is configured to receive an authenticate session request from a client application, to send the authenticate session request to the first AAA authentication server, to detect connectivity failure with the first AAA authentication server, and to send a reauthentication required message to the client application.

In another embodiment, a computing device is configured to execute the method for migrating a subscriber session from the first AAA authentication server to the second AAA authentication server, where the first AAA authentication server is stateful. The computing device includes a non-transitory computer readable medium having stored therein the AAA client, and a processor coupled to the non-transitory computer readable medium configured to execute the AAA client. The AAA client is configured to receive an authenticate session request from a client application, to send the authenticate session request to the first AAA authentication server, to detect connectivity failure with the first AAA authentication server, and to send a reauthentication required message to the client application.

In one embodiment, a control plane device is in a network including a plurality of data plane devices. The control plane device is in communication with the plurality of data plane devices and is configured to implement the method for migrating a subscriber session from a first AAA authentication server to a second AAA authentication server, where the first AAA authentication server is stateful. The control plane device includes a non-transitory computer readable medium having stored therein the AAA client, and a processor coupled to the non-transitory computer readable medium configured to execute the AAA client. The AAA client is configured to receive an authenticate session request from a client application, to send the authenticate session request to the first AAA authentication server, to detect connectivity failure with the first AAA authentication server, and to send a reauthentication required message to the client application.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
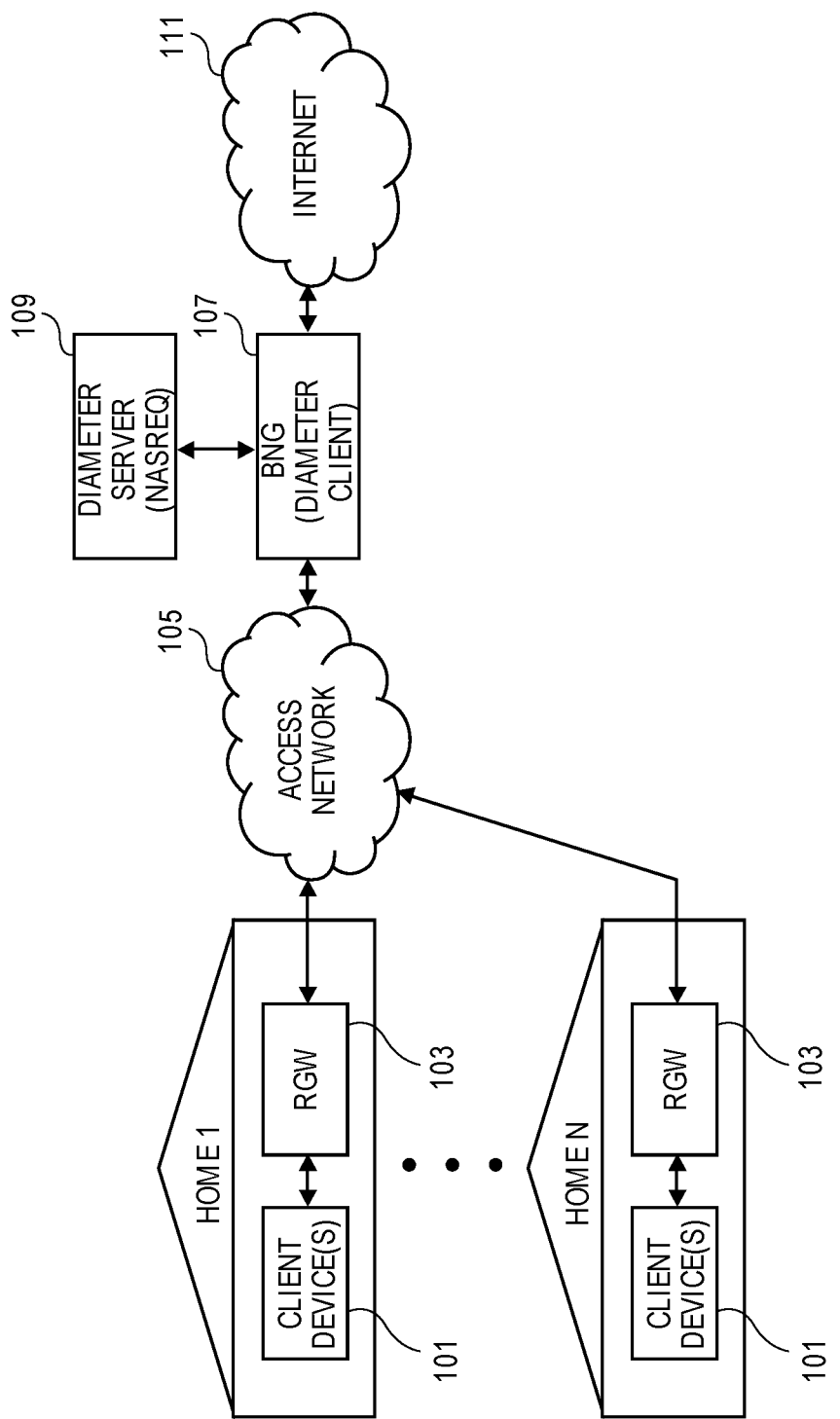
FIG. 1 is a diagram of one embodiment of an example network including an authentication, authorization, and accounting (AAA) service.

The following description describes methods and apparatus for enabling a transparent migration of a stateful authentication session between one authentication server and another authentication service. The embodiments identify a failure of a first authentication server and send a reauthentication request message to a client application. The client application is thereby caused to request a re-authentication of the session by sending an authentication session request. The new authentication session request will be sent to an available second authentication server to establish a new authentication session with the second authentication server in a manner that is transparent to the client application and second authentication server. This process minimizes the time for migrating an authentication session without requiring modification of or visibility at the client application of the failure of the first authentication server.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The embodiments are compatible with various authentication and accounting protocols. One skilled in the art would appreciate that the principles, processes, and structures described herein are applicable to other authentication, authorization, and accounting (AAA) protocols, however, the examples herein are primarily drawn to the Diameter protocol for sake of conciseness and clarity.

Diameter

The Diameter protocol is an AAA protocol which is widely used in the cellular or 'mobile' networks. Increasingly, with fixed-mobile convergence (FMC) of increased interest, i.e., the use of the same technologies in traditional 'fixed' networks and current 'mobile' networks, broadband remote access (BRAS) gateways and broadband network gateways (BNGs) are also starting to feature Diameter as the primary AAA protocol, often replacing RADIUS and similar technologies.

The Diameter protocol consists of a base protocol (defined in RFC-6733) and Diameter applications which can be defined by various standard bodies. The Diameter base protocol defines various Diameter nodes, including Diameter Clients, Servers, and Agents. Diameter Clients talks to Diameter Servers, either directly or via Diameter Agents. As used herein, a 'Diameter Peer,' is discussed, which could be either a Diameter Server or an Diameter Agent. More generally, each of these components could be referred to as AAA clients, servers, agents, and peers.

Diameter Clients are typically the AAA enforcing nodes, such as the BNG node. A Diameter Client can be characterized as including at least two logical components, namely, a Client Application of Diameter (herein a Diameter Client Application, client application or more generally an AAA client application), which is a client application of the Diameter protocol and a Diameter Client Protocol Stack (herein a Diameter protocol stack or more generally an AAA protocol stack), which provides Diameter protocol service to one or more of the Diameter Client Applications. The Diameter Clients need connectivity to a Diameter Peer such as a Diameter Server in order to perform all of the normal AAA actions. The Diameter Servers could be stateful, i.e., the Diameter Servers have a particular operating 'state' that defines the current operation of the Diameter Server. The current state can be a configuration of the Diameter Server and its resources and may be managed by an internal state machine. For stateful authentication, for any AAA session, the Diameter server and its authentication components need to receive "AA-Request/AA-Answer (AAR/AAA)" messages at the beginning of the session and "Session Termination Request/Session Termination Answer (STR/STA)" messages at the end of the session. The Diameter protocol defines both stateless and stateful mode for Diameter authentication servers For redundancy and load-balancing reasons, multiple Diameter Peers (i.e., multiple Diameter Servers) are configured. When subscriber sessions (communication sessions between the Diameter client and a subscriber related device) are being handled, the BNG node (executing the Diameter Client) chooses a specific Diameter Peer (Diameter Server) at subscriber session establishment time, based on a variety of load-balancing algorithm considerations. The Diameter Peer remains associated with the subscriber session for the lifetime of the session.

AAA in Network Architecture

FIG. 1 is a diagram of one embodiment of an example network where an AAA protocol may be utilized. In this simplified example, a set of client devices 101 that connect to a network provided by an Internet Service Provider (ISP) or mobile service provider. The example illustrates a fixed network, but the principles and techniques are equally applicable to a mobile network. In the example, the client devices 101 connect to residential gateways (RGWs) or similar network devices that are the edge of the ISP or mobile network. The home or local networks of the users may include additional devices such as access points and home routers. The RGWs provide connectivity to an access network 105 that enable a number of various subscribers (i.e., the owners of the client devices 101) to connect to the Internet and services provided by the ISP or mobile network. The RGWs enable connection to BNGs or BRAS via the access network.

The BNG (or BRAS) 107 provides various services for managing subscriber services including enforcing AAA policies. The BNG may handle many types of subscribers. The subscriber type is based on how a subscriber session is setup with the BNG. Dynamic session establishment is done using protocols such as point to point over Ethernet (PPPoE/PPP) or Layer 2 tunneling protocol (L2TP/PPP) and using Dynamic Host Configuration Protocol (DHCP) protocols. There are also modes to setup a subscriber session based on Internet Protocol (IP)-packet flow from the subscriber. A dynamic session is established in response to the subscriber connecting to the BNG. A static session establishment is done via configuration. Such subscriber sessions are long lived sessions, i.e., a static session is established once configured by an administrator and must remain functioning until torn down via configuration by an administrator.

The BNG 107 can implement the AAA functions for enforcement of policies on subscriber sessions via an AAA client (e.g., a Diameter Client). The AAA client communicates with an AAA server 109 (e.g., a Diameter Server). The AAA server manages the policies and performs accounting functions, authorization functions and authentication functions. The AAA server then directs or configures the AAA client to implement the AAA policies as needed. Such AAA policies can manage the subscriber access to other services and the Internet 111 including refusing connections, managing bandwidth and tracking resource usage according to a subscriber contract.

Figure 2:
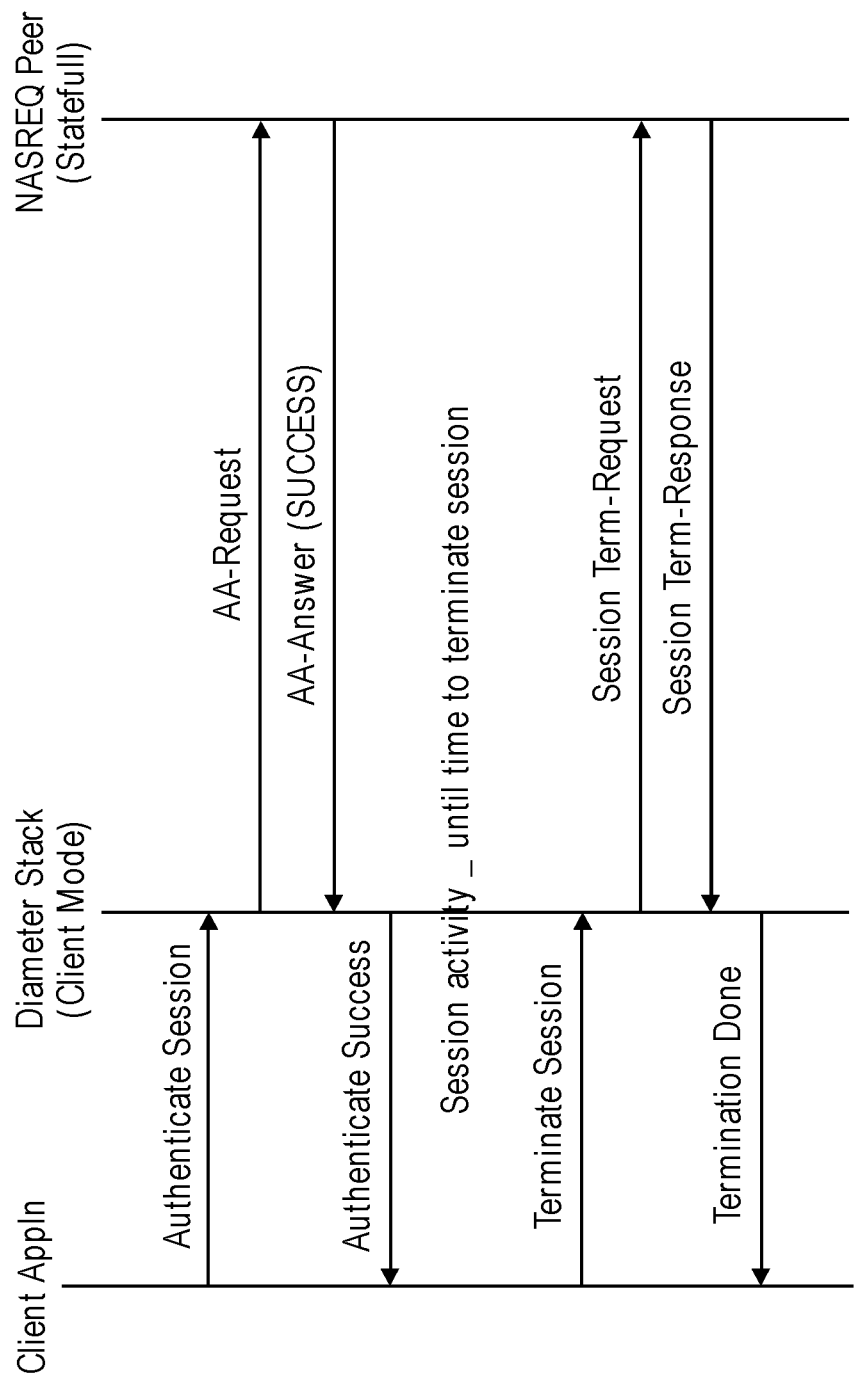
FIG. 2 is a diagram of one embodiment of a process for authentication between a client application and an authentication peer.

FIG. 2 is a diagram of one embodiment of a process for authentication between a client application and an authentication peer. In this example, a client application can be any application, often implemented at the BNG or similar subscriber gateway nodes, that communicates with an AAA server in this case a stateful AAA server. A client application that needs to use the AAA (e.g., Diameter) protocol will interact with the following logical components an AAA (e.g., Diameter) stack, which handles the AAA protocol aspects of the communication with the AAA server (e.g., a Diameter Server/Peer) and a AAA (e.g., Diameter) client application, which uses the AAA (e.g., Diameter) stack to exchange information with AAA peers. A single AAA stack instance could provide AAA protocol handling support to multiple AAA client applications. The diagram of FIG. 1 illustrates a simple session authentication case.

The client application initiates the session with an authenticate session request message that is sent to AAA (e.g., Diameter) stack operating in client mode, which can be referred to as the AAA client. The AAA client generates an authentication request that it sends to the AAA server, e.g., a) Authentication Authorization Request (AAR) message. In some embodiments, the AAR can be a Network Access Server Requirements (NASREQ) message. NASREQ is defined in RFC 7155. For redundancy and load-balancing reasons, multiple AAA servers are configured. The authentication request includes credentials from the client application that enable the AAA server to authenticate the client application and which enable the client application to utilize services of the network where the AAA server serves as a gatekeeper. When a subscriber authentication session is being handled, the client application, e.g., at the BNG node, chooses a specific AAA server, (e.g., a Diameter peer) at authentication session establishment time, based on a variety of possible load-balancing algorithms. The AAA server (e.g., a Diameter peer) remains associated with the session for the lifetime of the session. Diameter protocol (RFC-6733, Sec-8.1) defines both stateless and stateful mode for Diameter authentication/authorization servers.

The AAA server responds to the authentication request with an authentication answer, e.g., an Authentication Authorization—Answer (AAA) message that indicates authentication success. The AAA message can be a NASREQ AAA message. The AAA client then sends an authentication success message to the client application. The authentication session then persists and session activity can remain continuous until the client application decides to terminate the authenticate session. The client application in this case sends a terminate session message to the AAA client. The AAA client relays a session termination request to the AAA server. The AAA server replies with a session termination response that indicates an acknowledgement that the authenticate session is terminating at the AAA server. The AAA client relays this message as a termination done message to the client application.

Problems with this system occur where there is an interruption in the communication with the AAA peer (e.g., the AAA server). For the Diameter protocol for example, the Diameter base protocol defines one optional server-side state machine that may be utilized by applications that require keeping track of the session state at the AAA server. Such tracking is incompatible with the ability to handle long duration connectivity problems.

Figure 3:
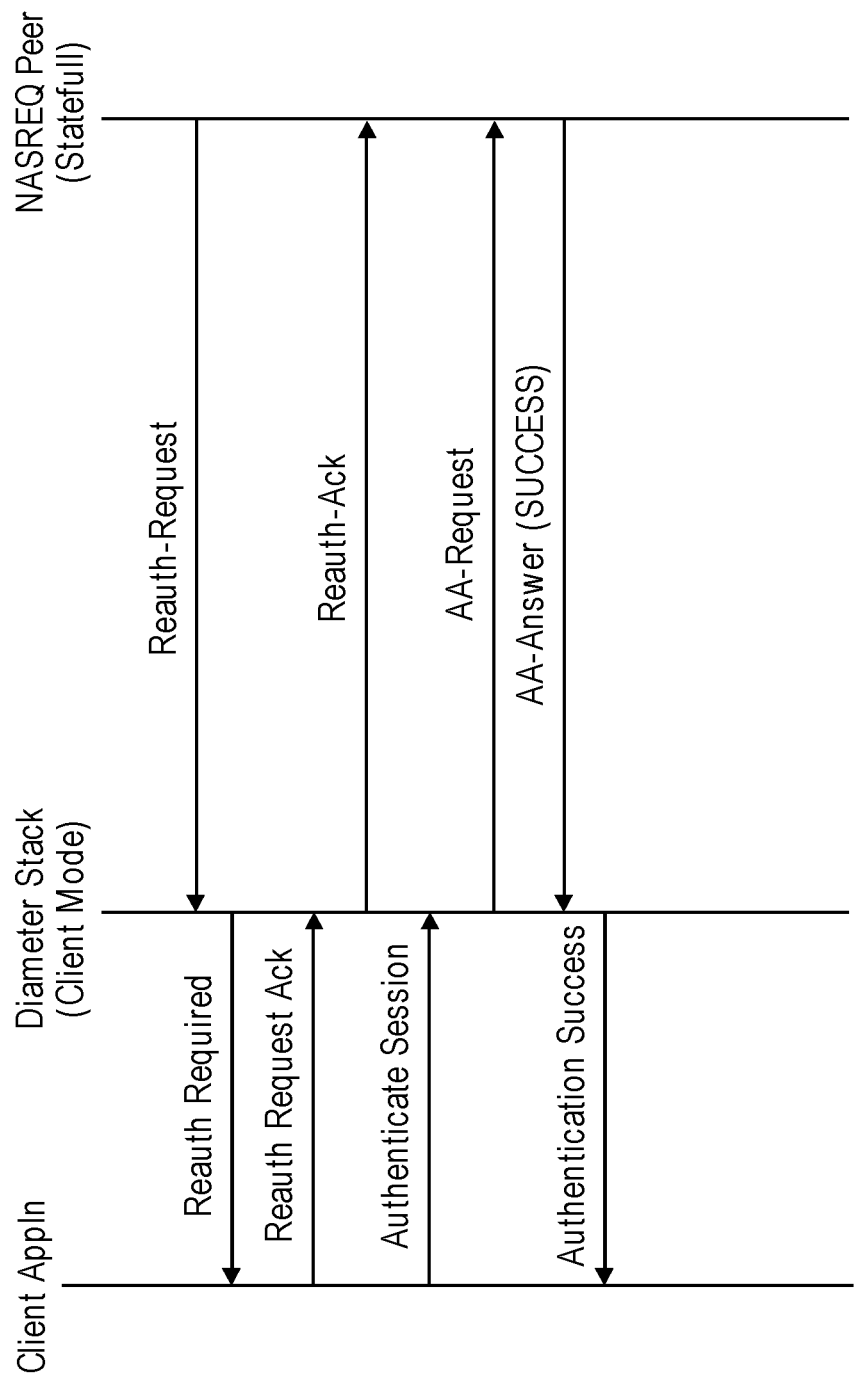
FIG. 3 is a diagram of one embodiment of a process for an authentication peer to request a reauthentication between a client application and the authentication peer.

FIG. 3 is a diagram of one embodiment of a process for an authentication peer to request a reauthentication between a client application and the authentication peer. The AAA server (e.g., a Diameter authentication server) can request that a client application reauthenticate a session. This can be done, for example, when some settings for a subscriber are changed and need to be applied on that subscriber's session. FIG. 3 provides an example exchange where reauthentication is requested by the AAA server.

In this example, the client application and AAA server have already established an authentication session. The AAA server decides that a reauthentication of the session is needed. The AAA server sends a reauthentication requests to the AAA client. The AAA client then sends a reauthentication required message to the client application. The client application responds with a reauthentication request acknowledgement to the AAA client. The AAA client sends a reauthentication acknowledgement to the AAA server.

The client application then sends an authenticate session request to the AAA client. The AAA client generates an authentication request, e.g., an AA-R message and sends it to the AAA server. The AAA server sends and authentication response, e.g., an AA-A message indicating success to the AAA client. The AAA client sends an authentication success message to the client application and the authentication session is re-authenticated.

Overview of Authentication Session Migration

An example scenario for authentication session migration is where an authentication session is established with a specific stateful AAA server (e.g., a Diameter NASREQ peer) for providing authentication and authorization services to a client application and AAA client. Migration is utilized in the case where the AAA server has gone down for any reason. This migration involves a new authentication/authorization handshake (AA-Request, AA-Answer) be done with a new stateful AAA server (e.g., a Diameter NASREQ peer) that is still functioning.

Without the embodiments, the migration would require that the client application be made aware of the AAA server failure and that the client application initiate a re-handshake to establish a new session with the new AAA server. However, if the AAA stack is considered as a microservice, the requirement being imposed on all client applications that use the microservice to be aware of server transition adds complexity to client applications and where the client application is not modified to identify the failure of the AAA server, then no migration is possible and the session fails.

The embodiments design the AAA stack to avoid client applications having AAA server availability awareness and explicit AAA server transition. The AAA client could be modified to cache the AA-request and replay it later in response to a AAA server failure. But this causes significant memory resource usage at the AAA client (e.g., a Diameter stack microservice most store a large number of these responses for replay). This options also includes significant complexity in AAA stack, due to a need for garbage collection to handle client application interface errors. If this potential implementation or existing implementations drop the authentication session due to AAA server failure it would cause poor user experience due to a disruption in service. While disruptions in service can be feasible for mobile subscribers, it is not feasible for BNG subscribers.

For BNG subscriber sessions established via DHCP as the session signaling protocol, there is no way to signal the subscriber to bring down the session. Enhancements to DHCP such as "DHCP FORCERENEW" are not widely implemented by many DHCP clients. The only way to deal with this is to have short lease times provided to subscribers. But that just reduces the disruption time when the session is brought down due to authentication server connectivity issues. For static subscriber sessions, there is no supported teardown of a session for subscribers, since teardown happens via configuration removal. It is possible to do an implicit teardown and bring up of a session immediately, but that causes traffic disruption and loss.

The embodiments overcome these issues and provide, in the event of connectivity disruption to a AAA authentication server that has been assigned to a session (chosen at session establishment time from multiple available AAA servers), to be able to choose another AAA authentication server and send subsequent packets of the given session to the newly selected authentication server.

The embodiments also insulate the client application from the knowledge of such changes to the assigned AAA server associated with a session. In this manner, the embodiments avoid client applications needing to know about the AAA server or AAA server connection issues in a transparent way and helps remove complexity from client applications. Client applications can thus focus only on information generation and consumption and leave AAA server resiliency aspects to the AAA stack.

Figure 4:
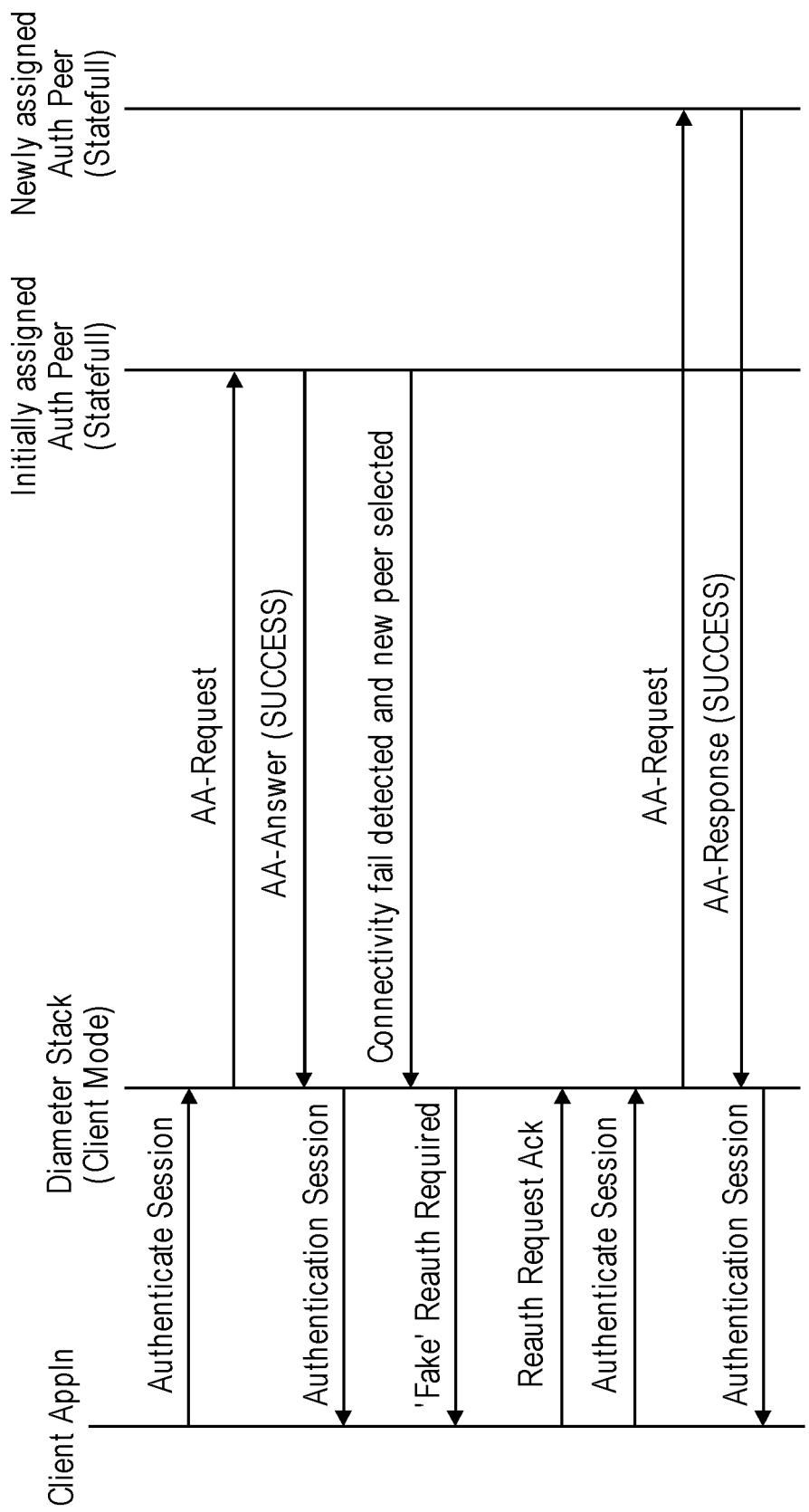
FIG. 4 is a diagram of one embodiment of a process for handling a transparent migration to a new AAA server, where the existing AAA server failure is detected by the AAA client.

FIG. 4 is a diagram of one embodiment of a process for handling a transparent migration to a new AAA server, where the existing AAA server failure is detected by the AAA client. When a client application seeks to establish a session, it signals the AAA client (e.g., a Diameter stack) with an authenticate session request. The AAA client selects a AAA authentication server, from the available set of AAA authentication servers. The AAA authentication servers may notify connected AAA clients or the AAA client may poll the AAA authentication servers to determine availability. The authentication exchange will happen with this selected AAA authentication server. The AAA client sends the authentication request to the selected AAA server, e.g., a AA-R message is sent. The selected AAA server responds to the AAA client with an authentication answer indicating successful authentication of the client application, e.g., via an AA-A message. In normal course, when the client application has completed a session, the termination request would happen with this same AAA server.

However, when the selected AAA authentication server fails, e.g., where a Diameter authentication server fails, the AAA client detects this failure and chooses a new server from the remaining set of available servers. The AAA client also makes note of this transition. To the new AAA server. The AAA client can track available AAA authentication servers by polling the known AAA authentication servers, by receiving advertisements of availability from the AAA authentication servers or through similar mechanisms and combinations thereof.

Upon detecting a failure with the selected AAA authentication server, the AAA client generates and sends a "fake reauthorization required" message to the client. The reauthorization request message is 'fake,' in the sense that the AAA client generates the reauthorization required message as though it was generated by or responsive to a request from the new AAA server. The client application responds with a reauthentication request acknowledgement to this 'fake' message, which is discarded by the AAA stack. In contrast, in normal operation the reauthorization would be generated based on a request form the AAA server and the acknowledgement would similarly be relayed to the AAA server as described herein above. However, in this case where the AAA server has failed, no reauthentication acknowledgment protocol message is sent out.

After the client application sends the reauthentication request acknowledgement, the client application sends a new authenticate session request to the AAA client, which will initiate an authentication request with a newly selected available AAA server, e.g., as a AA-R message as required by the NASREQ protocol. This authentication request message, is directed by the AAA stack to the newly selected and available AAA server. This authentication request message establishes a new session between the client application and the new AAA server, without either being aware of the migration. Later, at session termination time, the client application will perform a termination exchange with this second AAA server, assuming it continues to function without failure.

Figure 5:
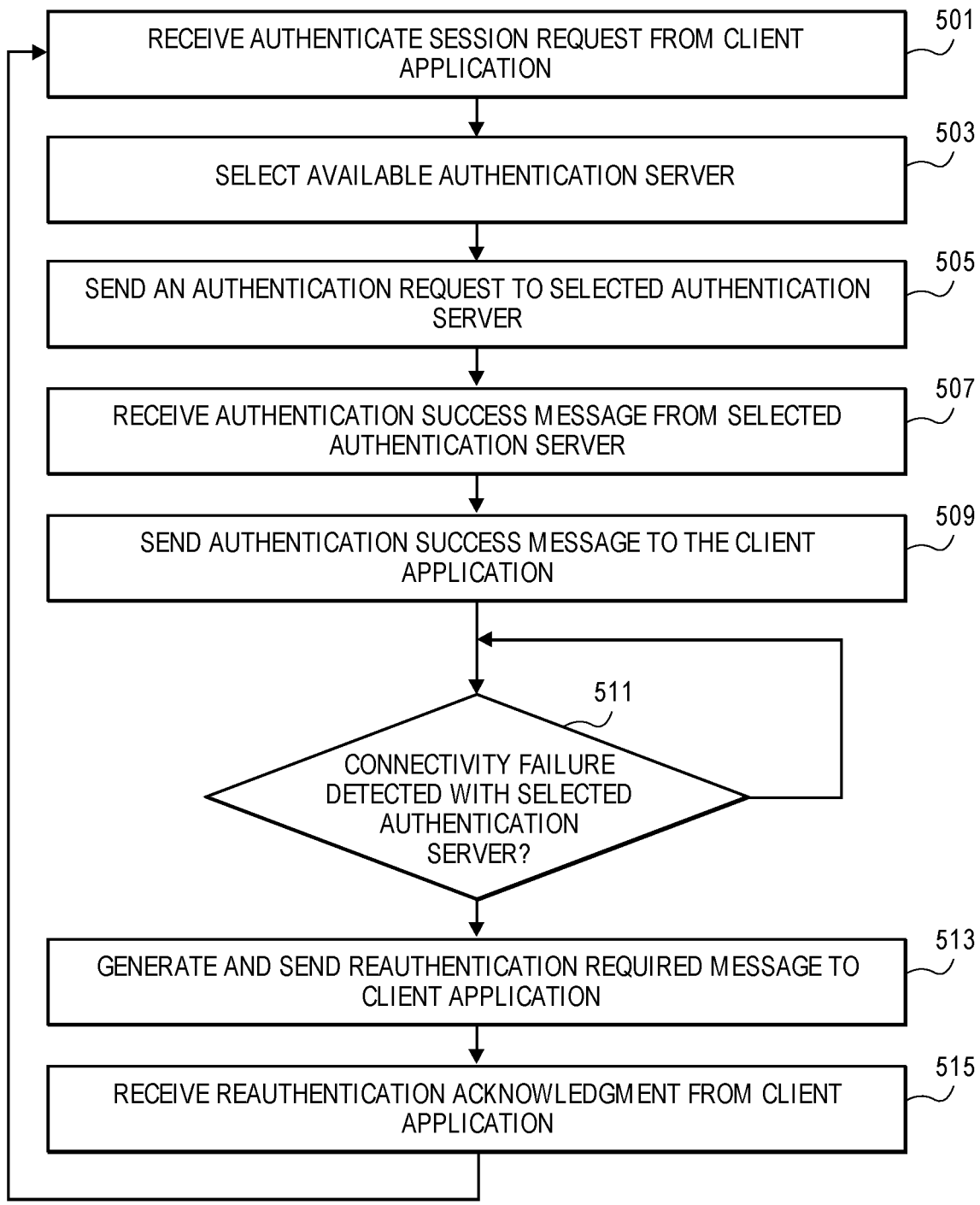
FIG. 5 is a diagram of one embodiment of the migration process at the network device executing the AAA client.

FIG. 5 is a diagram of one embodiment of the migration process at the network device executing the AAA client. The AAA client engages in the session authentication in response to receiving an authenticate session request from a client application (Block 501). The AAA client then selects one of the available authentication servers, i.e., an AAA server, which may be a Diameter server (Block 503). The AAA client may be able to track available AAA servers via advertisements from the AAA servers or by polling known AAA servers. Each of the AAA servers may be stateful that are available may be stateful. The AAA client sends an authentication request to the selected AAA authentication server (Block 505).

The selected AAA authentication server authenticates the credentials of the client application or the underlying subscriber that are included in the authenticate session request. Any type of credentials or similar information may be provided, e.g., as described by the NASREQ protocol, and any algorithm may be utilized to authenticate the credentials at the AAA authentication server.

The AAA client receives an authentication success message from the selected AAA authentication server (Block 507). Alternatively, a failure or error message may be received or occur in which case a session is not established between the client application and the AAA authentication server. An error may in some embodiments be returned to the client application, whereas in other embodiments no information is returned to the client application. The AAA client sends an authentication success message to the client application in response to the authentication success message received from the AAA authentication server (Block 509). In some embodiments, the same protocols and message types are utilized between the client application and AAA client as are used between the AAA client and the AAA authentication server, e.g., NASREQ protocol. However, in other embodiments, different message types and protocols are utilized between the client application and the AAA client than are used between the AAA client and the AAA authentication server.

While the selected AAA authentication server continues to function and be available to the AAA client, the session operates normally. However, the AAA client monitors the AAA authentication server status for failure (Block 513). In the case where a failure is detected, then the AAA client generates and sends a 'fake' reauthentication required message to the client application, to cause the client application to send a new authenticate session request that can be sent to a new AAA authentication server. The AAA client then receives an acknowledgement of the reauthentication required message from the client application (Block 515). The subsequent authenticate request message will be handled as a new authentication session and the set of available AAA authentication servers will remove the failed AAA authentication server. That is, the process will begin again (Block 501). Thus, but iterating through the process of FIG. 5, a new stateful AAA server can be selected to replace a failed stateful AAA server in response to the failure.

The embodiments thereby provide advantages over the prior art. Client applications need not require any complexity of awareness of AAA server status (e.g., of Diameter peers) used to provide authentication services and do not require awareness of the AAA server failures and related resiliency handling aspects. The application programming interface (API) between the AAA client (e.g., a Diameter stack) and client application is kept only to the messaging protocol required exchanges. The embodiments also provide simpler implementation in the AAA client to handle AAA authentication server transition (as compared to alternate implementation possibilities for providing this migration as discussed above).

Figure 6A:
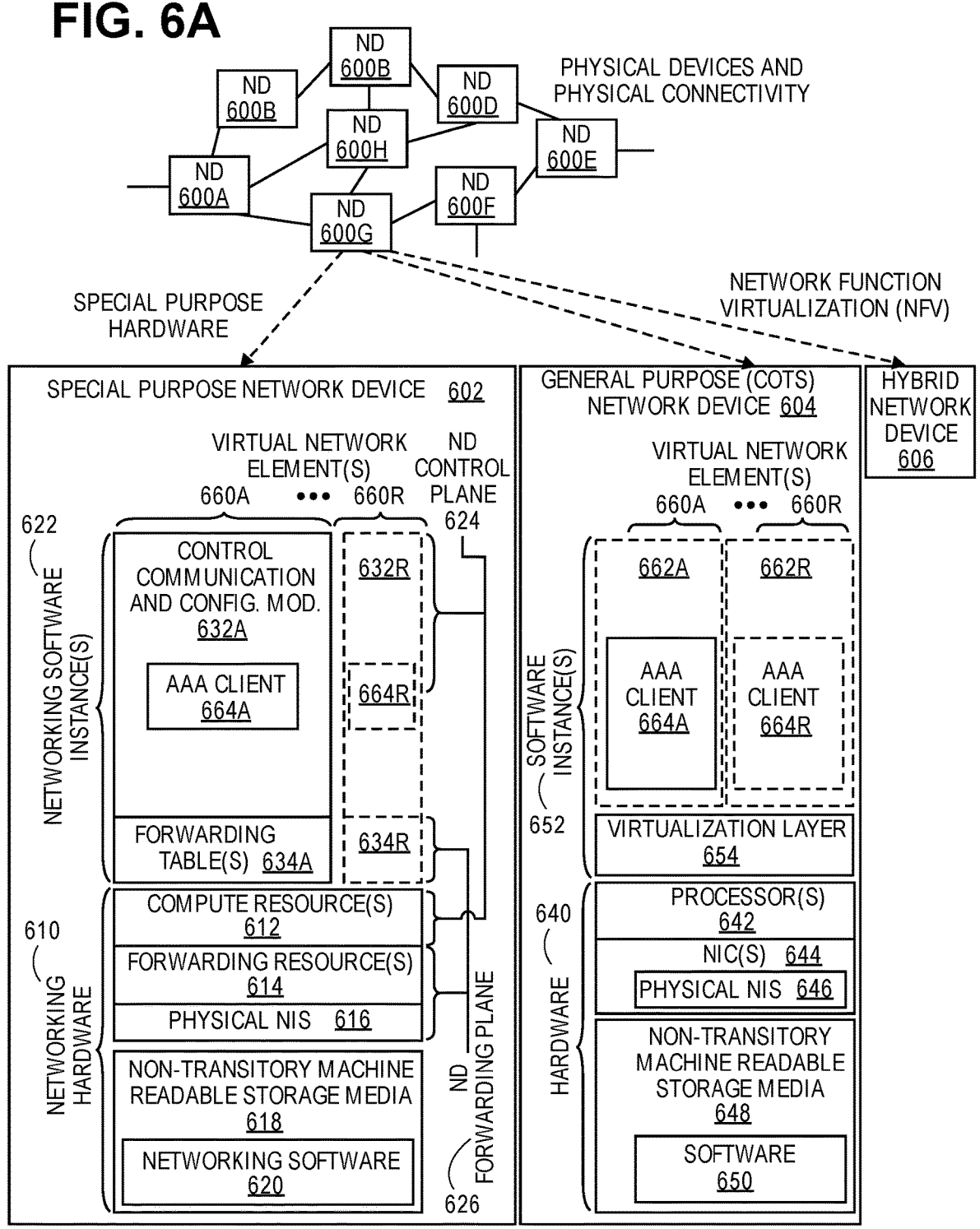
FIG. 6A illustrates connectivity between network devices (NDs) within an exemplary network, as well as three exemplary implementations of the NDs, according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application—specific integrated—circuits (ASICs) and a special-purpose operating system (OS); and 2) a general-purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine-readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

Figure 6B:
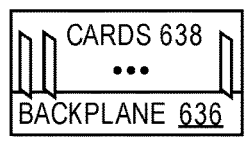
FIG. 6B illustrates an exemplary way to implement a special-purpose network device according to some embodiments of the invention.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general-purpose network device 604 includes hardware 640 comprising a set of one or more processor(s) 642 (which are often COTS processors) and physical NIs 646, as well as non-transitory machine-readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers).

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R. The Applications 664A-R can include AAA clients as described herein. The AAA clients may encompass AAA client applications and/or AAA protocol stacks. These embodiments further encompass Diameter implementations.

The virtual network element(s) 660A-R perform similar functionality to the virtual network element(s) 630A-R— e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high-volume server hardware, physical switches, and physical storage, which could be located in Data centers, NDs, and customer premise equipment (CPE). While embodiments of the invention are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 6C:
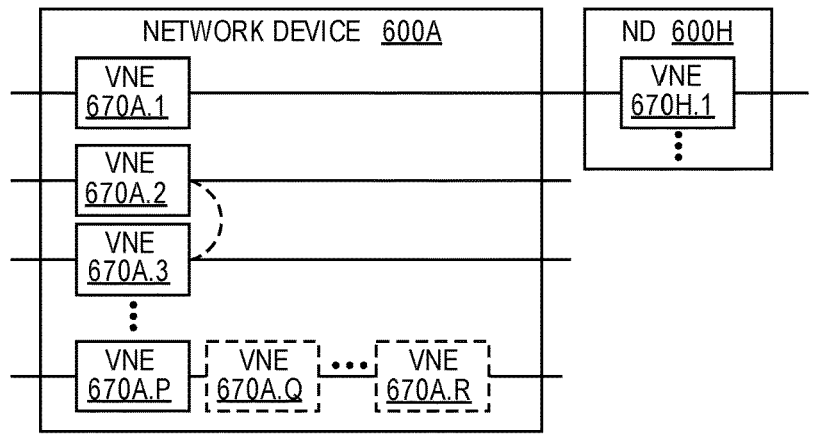
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service— e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software instances 662A-R may operate as servers; the same would be true for the hybrid network device 606; in the case of the special-purpose network device 602, one or more such servers could also be run on a virtualization layer executed by the processor(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 6D:
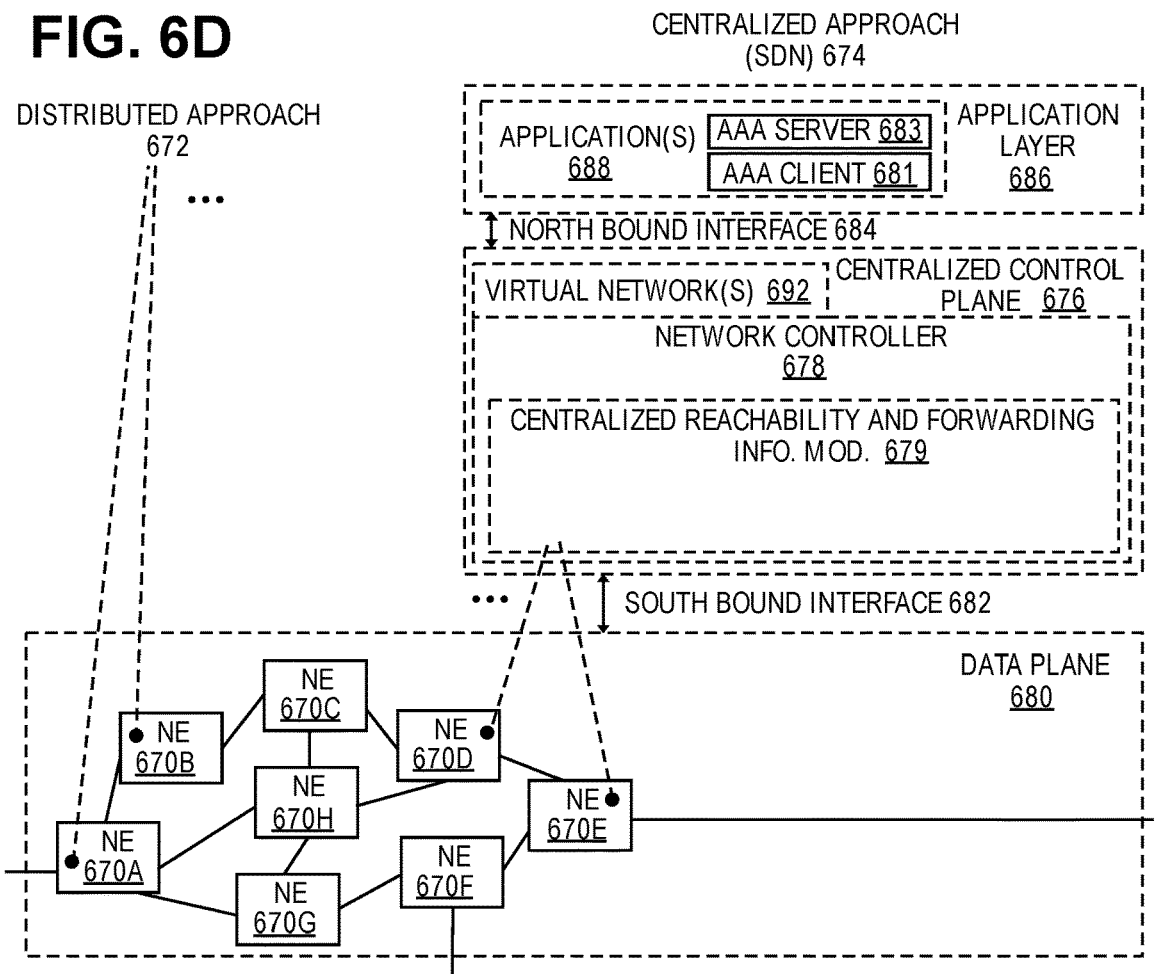
FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 670A-H (e.g., the processor(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general-purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the processor(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general-purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The Applications 688 may include AAA servers 683 and AAA clients 681 as described herein. The AAA clients may encompass AAA client applications and/or AAA protocol stacks. These embodiments further encompass Diameter implementations.

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
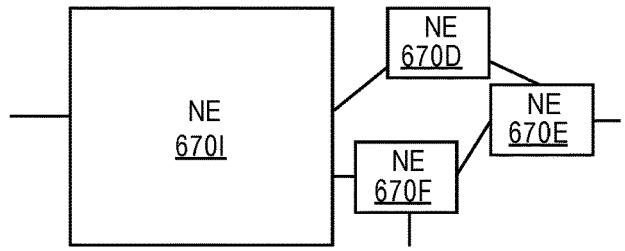
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
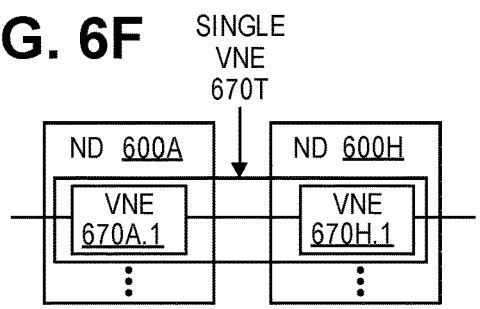
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
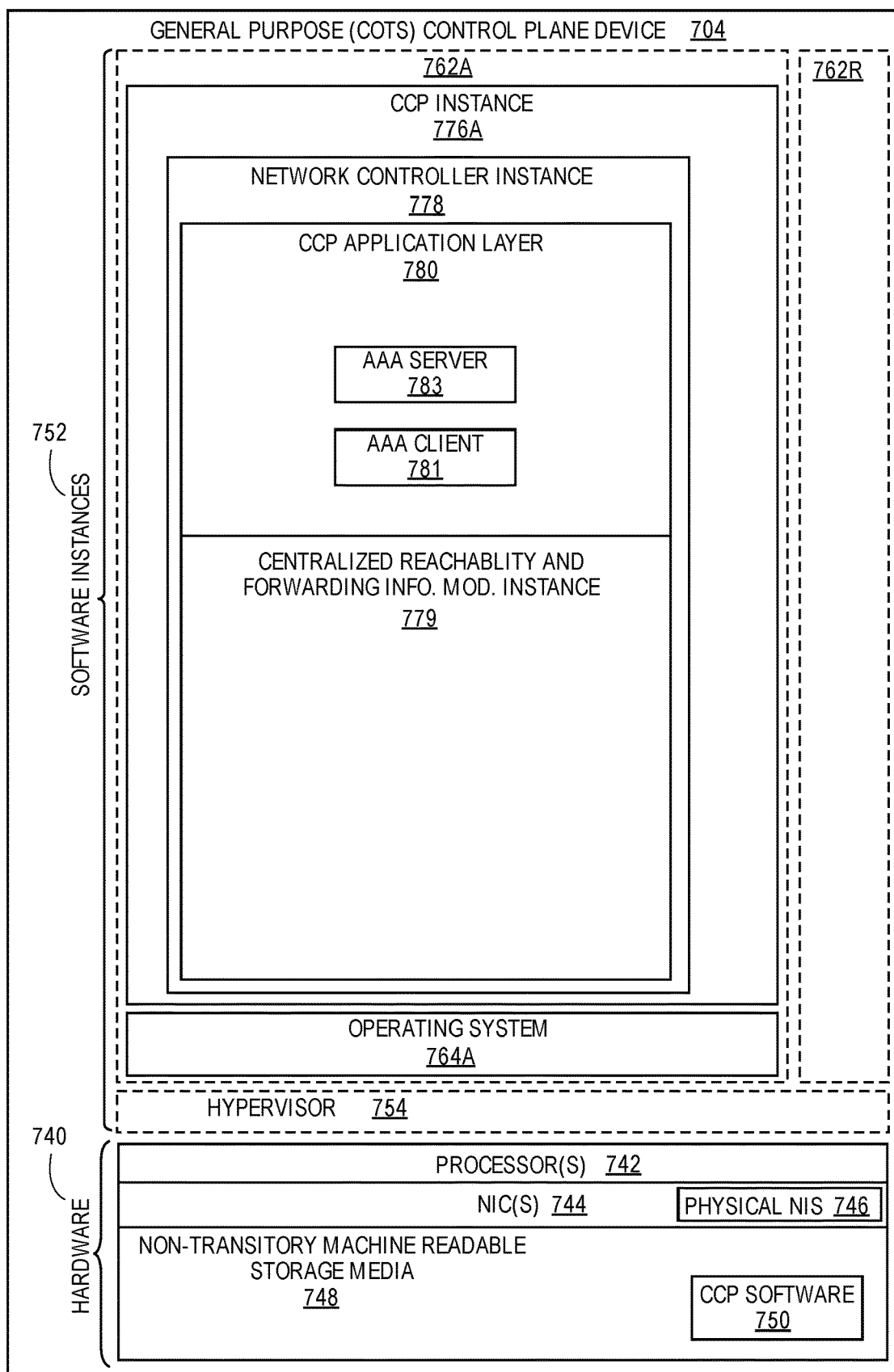
FIG. 7 illustrates a general-purpose control plane device with centralized control plane (CCP) software 750), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 7 illustrates, a general-purpose control plane device 704 including hardware 740 comprising a set of one or more processor(s) 742 (which are often COTS processors) and physical NIs 746, as well as non-transitory machine-readable storage media 748 having stored therein centralized control plane (CCP) software 750.

In embodiments that use compute virtualization, the processor(s) 742 typically execute software to instantiate a virtualization layer 754 (e.g., in one embodiment the virtualization layer 754 represents the kernel of an operating system (or a shim executing on a base operating system) that allows for the creation of multiple instances 762A-R called software containers (representing separate user spaces and also called virtualization engines, virtual private servers, or jails) that may each be used to execute a set of one or more applications; in another embodiment the virtualization layer 754 represents a hypervisor (sometimes referred to as a virtual machine monitor (VMM)) or a hypervisor executing on top of a host operating system, and an application is run on top of a guest operating system within an instance 762A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that, provide the particular OS services needed by the application, and the unikernel can run directly on hardware 740, directly on a hypervisor represented by virtualization layer 754 (in which case the unikernel is sometimes described as running within a LibOS virtual machine), or in a software container represented by one of instances 762A-R). Again, in embodiments where compute virtualization is used, during operation an instance of the CCP software 750 (illustrated as CCP instance 776A) is executed (e.g., within the instance 762A) on the virtualization layer 754. In embodiments where compute virtualization is not used, the CCP instance 776A is executed, as a unikernel or on top of a host operating system, on the "bare metal" general purpose control plane device 704. The instantiation of the CCP instance 776A, as well as the virtualization layer 754 and instances 762A-R if implemented, are collectively referred to as software instance(s) 752.

In some embodiments, the CCP instance 776A includes a network controller instance 778. The network controller instance 778 includes a centralized reachability and forwarding information module instance 779 (which is a middleware layer providing the context of the network controller 678 to the operating system and communicating with the various NEs), and an CCP application layer 780 (sometimes referred to as an application layer) over the middleware layer (providing the intelligence required for various network operations such as protocols, network situational awareness, and user—interfaces). At a more abstract level, this CCP application layer 780 within the centralized control plane 676 works with virtual network view(s) (logical view(s) of the network) and the middleware layer provides the conversion from the virtual networks to the physical view. The Application layer 780 may support AAA servers 783 and AAA clients 681 as described herein. The AAA clients may encompass AAA client applications and/or AAA protocol stacks. These embodiments further encompass Diameter implementations.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for migrating a subscriber session from a first authentication, authorization, and accounting (AAA) authentication server to a second AAA authentication server, where the first AAA authentication server is stateful, the method comprising:
   receiving, by an AAA client, an authenticate session request from a client application;
   sending the authenticate session request to the first AAA authentication server;
   detecting connectivity failure with the first AAA authentication server;
   upon detecting connectivity failure, sending a fake reauthentication required message to the client application, to cause the client application to send a new authenticate session request to the second AAA authentication server;
   receiving a new authenticate session request from the client application; and
   forwarding the new authenticate session request to the second AAA authentication server to establish a new session between the client application and the second AAA server, without the client application being aware of the migration, wherein the second AAA authentication server is selected from a set of available AAA authentication servers.

2. The method of claim 1, further comprising:
   generating, by the AAA client, the reauthentication required message to be sent to the client application.

3. The method of claim 1, further comprising:
   selecting the first AAA authentication server from a set of available AAA authentication servers.

4. The method of claim 1, wherein an AAA protocol utilized by the first AAA authentication server, second AAA authentication server, AAA protocol stack and AAA client application is Diameter.

5. The method of claim 1, further comprising:
   discarding, by the AAA client, a reauthentication request acknowledgement message received from the client application to be forwarded to the first AAA authentication server.

6. A network device configured to execute a plurality of virtual machines, the virtual machines configured to support network function virtualization (NFV), the plurality of virtual machines to support a method for migrating a subscriber session from a first authentication, authorization, and accounting (AAA) authentication server to a second AAA authentication server, where the first AAA authentication server is stateful, the network device comprising:
   a non-transitory computer readable medium having stored therein a AAA client; and
   a processor coupled to the non-transitory computer readable medium configured to execute a virtual machine from the plurality of virtual machine, the virtual machine to execute the AAA client, the AAA client configured to receive an authenticate session request from a client application, to send the authenticate session request to the first AAA authentication server, to detect connectivity failure with the first AAA authentication server, and upon detecting connectivity failure, the AAA client is configured to send a fake reauthentication required message to the client application, to cause the client application to send a new authenticate session request to the second AAA authentication server,
   wherein the processor of the network device is further configured to:
   receive a new authenticate session request from the client application; and forward the new authenticate session request to the second AAA authentication server to establish a new session between the client application and the second AAA server, without the client application being aware of the migration, wherein the second AAA authentication server is selected from a set of available AAA authentication servers.

7. The network device of claim 6, wherein the AAA client is further to generate the reauthentication required message to be sent to the client application.

8. The network device of claim 6, wherein the AAA client is further to select the first AAA authentication server from a set of available AAA authentication servers.

9. The network device of claim 6, wherein an AAA protocol utilized by the first AAA authentication server, second AAA authentication server, AAA protocol stack and AAA client application is Diameter.

10. A computing device configured to execute a method for migrating a subscriber session from a first authentication, authorization, and accounting (AAA) authentication server to a second AAA authentication server, where the first AAA authentication server is stateful, the computing device comprising:
   a non-transitory computer readable medium having stored therein a AAA client; and
   a processor coupled to the non-transitory computer readable medium configured to execute the AAA client, the AAA client configured to receive an authenticate session request from a client application, to send the authenticate session request to the first AAA authentication server, to detect connectivity failure with the first AAA authentication server, and upon detecting connectivity failure, the AAA client is configured to send a fake reauthentication required message to the client application, to cause the client application to send a new authenticate session request to the second AAA authentication server,
   wherein the processor of the computing device is further configured to:
      receive a new authenticate session request from the client application; and forward the new authenticate session request to the second AAA authentication server to establish a new session between the client application and the second AAA server, without the client application being aware of the migration, wherein the second AAA authentication server is selected from a set of available AAA authentication servers.

11. The computing device of claim 10, wherein the AAA client is further to generate the reauthentication required message to be sent to the client application.

12. The computing device of claim 10, wherein the AAA client is further to select the first AAA authentication server from a set of available AAA authentication servers.

13. The computing device of claim 10, wherein an AAA protocol utilized by the first AAA accounting server, second AAA accounting server, AAA protocol stack and AAA client application is Diameter.

14. A control plane device in a network including a plurality of data plane devices, the control plane device in communication with the plurality of data plane devices and configured to implement a method for migrating a subscriber session from a first authentication, authorization, and accounting (AAA) authentication server to a second AAA authentication server, where the first AAA authentication server is stateful, the control plane device comprising:
   a non-transitory computer readable medium having stored therein a AAA client; and
   a processor coupled to the non-transitory computer readable medium configured to execute the AAA client, the AAA client configured to receive an authenticate session request from a client application, to send the authenticate session request to the first AAA authentication server, to detect connectivity failure with the first AAA authentication server, and upon detecting connectivity failure, the AAA client is configured to send a fake reauthentication required message to the client application, to cause the client application to send a new authenticate session request to the second AAA authentication server,
   wherein the processor of the control plane device is further configured to:
      receive a new authenticate session request from the client application; and forward the new authenticate session request to the second AAA authentication server to establish a new session between the client application and the second AAA server, without the client application being aware of the migration, wherein the second AAA authentication server is selected from a set of available AAA authentication servers.

15. The control plane device of claim 14, wherein the AAA client is further to generate the reauthentication required message to be sent to the client application.

16. The control plane device of claim 14, wherein the AAA client is further to select the first AAA authentication server from a set of available AAA authentication servers.

17. The control plane device of claim 14, wherein an AAA protocol utilized by the first AAA accounting server, second AAA accounting server, AAA protocol stack and AAA client application is Diameter.

* * * * *